United States Patent [19]

Hunter

[11] Patent Number: 5,044,090

[45] Date of Patent: Sep. 3, 1991

[54] TRUCK SPAN MEASURING APPARATUS

[76] Inventor: Mark A. Hunter, Box 1068, Afton, Wyo. 83110

[21] Appl. No.: 598,002

[22] Filed: Oct. 15, 1990

[51] Int. Cl.$^5$ .............................................. G01B 3/10
[52] U.S. Cl. ...................................... 33/760; 33/768; 33/770; 33/203; 33/203.18
[58] Field of Search ................ 33/759, 760, 755, 768, 33/770, 203, 203.18, 203.19, 600, 608, 406, 404, 336, 339, 827, 783; 248/201, 205.1, 225.31, 57, 343, 354.3; 211/123

[56] References Cited

U.S. PATENT DOCUMENTS

| | | | |
|---|---|---|---|
| 3,686,770 | 8/1972 | Davis | 33/755 X |
| 3,990,666 | 11/1976 | Horrison et al. | 248/205.1 |
| 4,815,216 | 3/1989 | Swayne | 33/203.8 |

FOREIGN PATENT DOCUMENTS

| | | | |
|---|---|---|---|
| 553459 | 2/1958 | Canada | 248/57 |
| 1370361 | 7/1964 | France | 248/354.3 |
| 213273 | 6/1941 | Switzerland | 248/354.3 |

*Primary Examiner*—Harry N. Haroian
*Attorney, Agent, or Firm*—Trask, Britt & Rossa

[57] ABSTRACT

Disclosed is a truck span measuring apparatus adapted for positioning in the wheel well of a vehicle whose span is to be measured. The apparatus includes a housing having at least one female-threaded socket positioned on one end thereof. A male-threaded shaft is threadedly inserted into the socket and furthermore extends into the hollow interior of the housing. A pad-fitted end assembly is mounted on the free end of the shaft and is adapted to engage against the inner sidewall of a wheel well of a vehicle to be measured. The opposing end of the housing is also fitted with a pad-fitted bracket assembly which is adapted to engage against the interior sidewall of the housing of the wheel well. A collar assembly having a threaded bolt which extends threadedly therethrough, is mounted on the housing to slidable along the length of the housing. The threaded bolt is adapted to engage against the housing and provide a pressure-fit union for purposes of releasably securing the collar at a preselected location along the length of the housing. The collar is likewise fitted with a outwardly-extending shaft which is configured to receive and retain the bracket mounted on the free end of a measuring tape.

9 Claims, 4 Drawing Sheets

TRUCK SPAN MEASURING APPARATUS

BACKGROUND OF THE INVENTION

1. Field

This invention relates to devices utilized in measuring the length of objects. More particularly, the invention is directed to an apparatus which may be utilized in the measuring of truck spans, specifically spans of semi-trucks and their associated trailers.

2. Statement of the Art

Paved highways and roads, due to the compositional nature of their structure, have limits in their capacity to carry heavy loads. When trucks or other vehicles, which carry heavy loads, pass over roads with any degree of regularity, the compressive force which is imparted to the paved structure can, over time, contribute to the deterioration or the actual destruction of the road itself. In order to extend the wear life of public roads and highways, state governmental bodies have legislated a number of statutes and regulations which are intended to limit the loads which vehicular traffic can carry over public thoroughfares. These laws typically take into consideration not only the magnitude of the load being carried by a vehicle, but furthermore, the laws also address the way a load is distributed on a vehicle. Many statutes and regulations take into a consideration the span or distance between the load-supporting wheels of the truck and the truck's trailer in which the load is being carried. Various formulas are used to determine the permissible loads which may be carried by a given truck having a specific span characteristic.

While statutes and regulations limiting the loads being carried over public thoroughfares are viewed with favor by civil engineers and statutory legislative bodies alike, their implementation by law enforcement authorities has encountered some difficulty. The most specific problem faced in enforcing load-carrying laws is the procedures involved in actually measuring the span of the truck.

A conventional practice, utilized by a majority of law enforcement officials is to use a conventional measuring tape to measure the truck's span. The use of a measuring tape requires the user to anchor the free end of the tape at a bench mark location while the remainder of the tape is stretched along the length of the truck. It is the anchoring of the measuring tape to a bench mark which has contributed to the difficulties which have arisen in taking quality measurements of a truck span.

Owing to budgetary constraints, law enforcement agencies are typically restricted to allocating only a single law enforcement individual to the measurement of any given truck which may enter a weighing station for measurement. With this constraint in place, this single law enforcement officer is oftentimes obliged to request the assistance of the vehicle's driver in taking the requisite measurements. While initially the use of the vehicle's driver as an assistant in the measuring process may appear to be a ready expedient, the use of the driver has contributed enormously to creating problems for law enforcement officers in obtaining accurate measurement data. Understandably, the truck driver has a vested interest in the measurements being taken. If the driver is found to have exceeded the load-carrying capability of his vehicle, oftentimes fines of a considerable dollar amount are assessed against the driver. Since the law enforcement officer is generally the individual which reels out the measuring tape and therefore is in a position to observe the marked portion of the tape which corresponds to the measurement is being taken, it follows that the truck driver is consistently requested to hold the free end of the measuring tape at a bench mark location. It follows that many drivers are incentivized to tamper with the measurements being taken by adjusting the positioning of the end of the measuring tape during the measuring process. Since many of the truck trailers which are measured in weigh stations achieve a considerable length, oftentimes when the measuring tape is extended sufficiently outward, e.g. from the frontmost tire to the rearmost tire of the truck, the law enforcement officer is sufficiently distanced from the free end of the measuring tape that he is unable to accurately observe whether or not the truck driver is positioning the end of the tape at the requisite benchmark location. It has been found that many truck drivers have been involved in attempting to alter, or otherwise modify, the results of the measuring process, by intentionally misaligning the free end of the measuring tape.

To complicate matters further, it has been reported that a recent judicial decision in this area held that the law enforcement officer's use of the truck driver in assisting in the measuring process was impermissible in that the truck driver was being asked by the law enforcement officer to participate in an activity which may in fact incriminate the driver.

Attempts at providing a retainer which is mountable on the vehicle for purposes of securing the end of the measuring tape without the constant attendance of a human being is complexified by the nature of the measurements being taken. The measurements which are utilized by law enforcement officials are typically measured from the center of one wheel to the center of a second wheel. The use of this "center-to-center" measuring approach obligates the law enforcement officer to position the end of the tape at a location which is collinear with the axle of the vehicle. Recognizing that many truck wheels do not include a structural member which is positioned at the center of the wheel to which the end of the tape can be affixed, the positioning of the tape at this location causes some difficulty. A second concern arises from the common use by many truck drivers of specialized wheels. For example, many truck drivers, in order to customize the appearance of their vehicles, have special chromed wheels which are expensive to produce and maintain. Truck operators are therefore extremely hesitant to permit the positioning or mounting of any measuring device on the wheel for fear that it may scratch or otherwise deface the highly polished surface of the wheel.

Another consideration is that the use of metal measuring tapes introduces a structural problem. Recognizing that many trucks achieve lengths over 75 feet, it is recognizable that when the tape is extended this distance, not only would the weight of the tape itself exert a considerable downward force on any retainer to which it may be attached, but furthermore, in order to obtain an accurate measurement, the law enforcement officer must pull the tape taut, which would apply additional tension to the support.

Given the above-stated problems, it follows that there presently exists a need for an apparatus which is useable to form a retainer for purposes of holding a free end of a measuring tape during its use in measuring the various spans of a truck or other vehicle.

SUMMARY OF THE INVENTION

A truck span measuring apparatus adapted for a releasable mounting within the wheel well of a vehicle is disclosed. The apparatus, which functions as is a retainer adapted for securing the free end of a measuring tape, includes a housing and two opposing end segments. At least one of the end segments is adapted for being extended adjustably outwardly from the housing. The distance between the free ends of the end segments is lengthwise adjustable to correspond generally to the inner diameter of a wheel well. A collar is mounted on the housing to be slidably displaceable along a length of the housing. The collar is fitted with a retaining means adapted for releasably securing the collar to the housing at a selected location along the length of the housing. A securement means, fitted to the collar, is adapted to releasably retain the end of a measuring tape upon its mounting thereon.

DETAILED DESCRIPTION OF THE DRAWINGS

Figure 1:
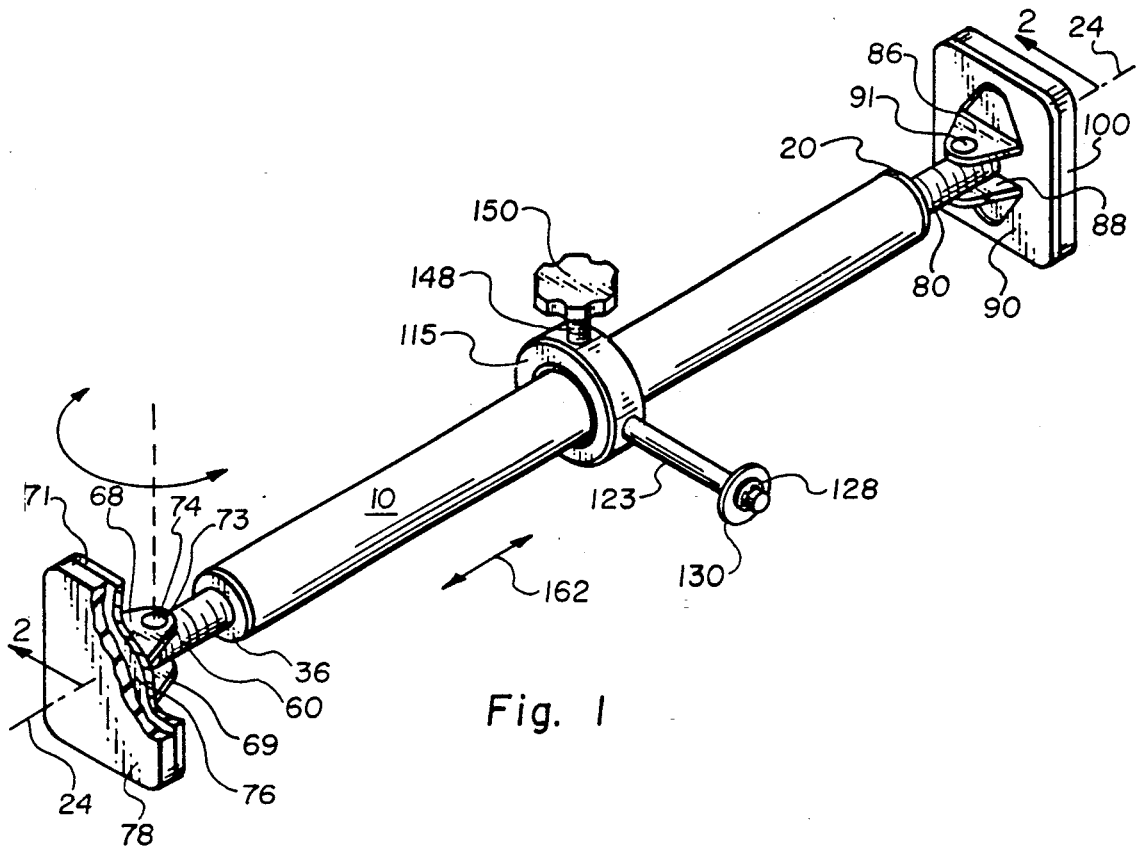
FIG. 1 is a perspective view of a truck span measuring device apparatus wherein one end of the end segment of the apparatus is shown in cutaway view.

As shown in FIG. 1, a truck span measuring apparatus of the invention includes generally a tubular housing 10 and a pair of end segments 12 and 14 which are mounted on opposing ends 18 and 20 of housing 10.

Figure 2:
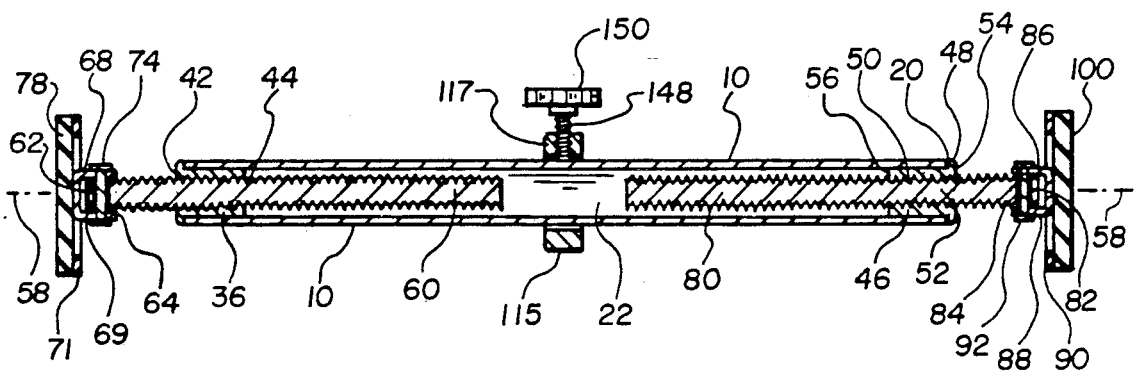
FIG. 2 is a cross-sectional view of the truck span measuring apparatus of FIG. 1 taken along the sectional lines 2—2.

As shown in FIGS. 1 and 2, housing 10 is a right cylindrical tubular member having a hollow interior 22 which extends along the entire length of the housing.

As shown, channel 22 is generally cylindrical in configuration and is positioned about a common longitudinal axis 24 with the sidewall 26 of housing 10. Secured within open end 18 of housing 10 is a socket 30 which is shown to include a lip 32 which extends over the end 18 of housing 10 to form an abutment surface against which the socket 30 abuts to retain the socket 30 in position within the channel 22. The socket 30 defines a plurality of female threads 36 which extend along the complete length of a channel 40 which extends along the length of the socket. The channel 40 defines an open inlet 42 and open outlet 44.

As shown in FIG. 2, the opposing end 20 of housing 10 is also fitted with a socket 46 of similar construction to socket 30, i.e. it defines a flange or lip 48 positioned on its outermost end adapted to engage the end 20 of housing 10 and form a means of securing the socket 46 in place within channel 22. Socket 46 furthermore includes a plurality of female threads 50 which are defined about a linearly-oriented channel 52 which extends from an open inlet 54 to an open outlet 56. The socket 36 and the socket 46 are each positioned about a respective longitudinal axis which axis is collinear with the longitudinal axis of channel 22 and the longitudinal axis of housing 10, i.e. axis 24. Threadedly inserted in socket 36 is an elongate, linear, male-threaded shaft 60. The length of socket 36 is dimensioned sufficiently as to provide a degree of stability and integrity to the shaft 60 upon that shaft's threaded insertion through the socket 36. In preferred constructions, the length of shaft 60 corresponds generally with one half of the length of housing 10. This particular configuring of shaft 60, together with a similar configuring of a shaft 80 threadedly inserted in socket 46 provides the apparatus with a means of securing itself within relatively small wheel wells while also permitting securement within wheel wells which are approximately two times the length of the housing 10. The free end 62 of shaft 60 defines a channel 64 which extends through the complete thickness of the shaft 60. As shown in FIGS. 1 and 2, shaft 60 may be generally cylindrical in configuration.

A pair of brackets 68 and 69 which are formed by bending the sections of a planar sheet 71 formed generally by a pair of "V"-shaped incisions in sheet 71 are positioned to extend outwardly, generally orthogonally, to the plane of sheet 71 and parallel to one another. Each of these brackets 68 and 69 defines an aperture or opening which extends through the thickness of the respective bracket. These apertures, designated generally 73, are positioned to register one with another. A retaining pin 74 is inserted through the aperture 73 in bracket 68 thereafter through the channel 64 in shaft 60 and subsequently through the aperture 73 in bracket 69. The top and bottom ends of the pin 74 are flattened out or fitted with retaining rings so as to form a retained pivot axle for the brackets 68 and 69 about the shaft 60. The pin 74 provides a vertical axis for the sheet 71 when the apparatus is in the position shown in FIG. 1. The sheet 71, by means of brackets 68 and 69 and retaining pin 74, is permitted to rotate about the shaft 60 in the direction indicated by arrow 75. Mounted on the outwardly-facing surface 76 of sheet 71, is a pad 78 which is fabricated of a soft, non-abrasive material such as rubber. The pad 78 is adapted to be abutted against the inner sidewall surface of a wheel well. Pad 78 provides a surface having a high coefficient of friction. Due its material composition, the pad 78 tends to retard any slippage of the apparatus along the surface of the wheel. Furthermore, the pad 78 minimizes any scratching or defacing of the wheel sidewall surface. It follows that the use of the pad 78 not only addresses the problem of securing the apparatus in place against the wheel well, furthermore, the pad 78 assists in minimizing, if not eliminating, any defacing or scratching of the wheel well surface. This non-abrasive characteristic is especially desirable should the wheel well surface be fabricated from a highly-polished chrome or exotic material.

Socket 46 may likewise be fitted with an elongate, male-threaded shaft 80 which is generally right cylindrical in configuration and dimensioned lengthwise, as is shaft 60, to correspond generally to one half the length of housing 10. Similar to shaft 60, shaft 80 defines on its free end 82 a channel 84 which extends through the thickness of the shaft 80 generally orthogonal to the longitudinal axis 24 of shaft 80. A pair of brackets 86 and 88, formed by bending portions of a sheet 90 from the "V"-shaped cuts in that sheet extend orthogonally outward from the planar sheet 90 generally parallel to one another. Each of the brackets 86 and 88 define a respective aperture 91 therethrough. The apertures 91 are positioned in registration one with another whereby a retaining pin, i.e. an elongate shaft 92, is inserted first through the aperture 91 in bracket 86 and subsequently through the channel 84 in shaft 80 and thereafter through the aperture 91 in bracket 88. The retaining pin 92 is fitted on its opposing ends with a flattened abutment surface adapted to retain retaining pin 92 in place in the apertures 90 and through the channel 84. As with plate 71, plate 90 is likewise fitted with a pad 100 which is fabricated from elastomeric or other soft material having a high coefficient of friction and adapted for abutment against the interior sidewall of a wheel well.

Figure 3:
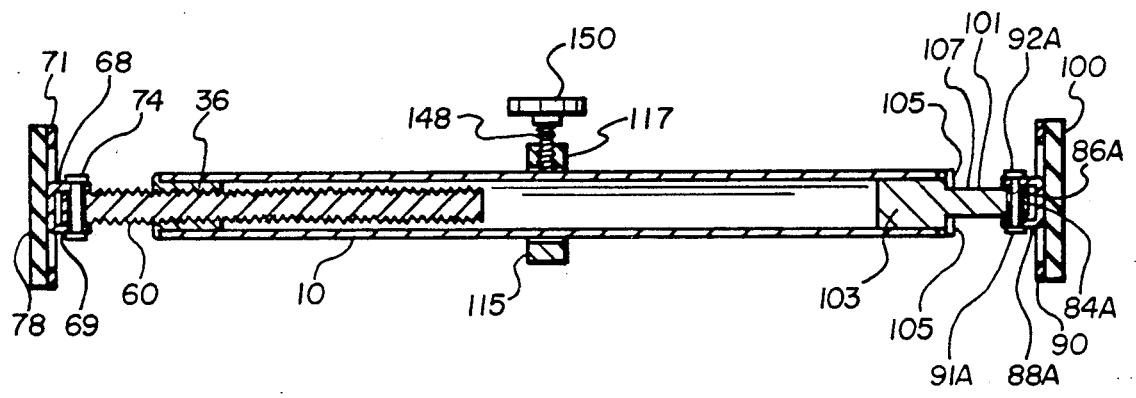
FIG. 3 is a cross-sectional view of a truck span measuring apparatus of the type shown in FIG. 1 wherein one of the end segments has an alternative construction.

In an alternative construction as shown in FIG. 3, the socket 46 and its accompanying shaft 80 may be replaced by a solid, one-piece member identified generally as 101. As shown in FIG. 3, member 101 includes a generally cylindrical section 103 having an outer diameter which corresponds generally with the inner diameter of channel 22. The segment 103 is inserted into channel 22 at the end 20 of housing 10 and is secured therein by adhesives which have been placed on the exterior surface of the segment 103 thereby securing that segment within the channel 22 as shown in FIG. 3. In some embodiments, the segment 103 may include a flange-like lip 105. Lip 105 is adapted to abut against the end 20 of housing 10 and thereby form a securement means for retaining the segment 103 in position within channel 22. Mounted on segment 103 to extend outwardly therefrom is a generally cylindrical segment 107 which extends outwardly generally along the longitudinal axis 24 of housing 10. Mounted on the free end of the cylindrical segment 107 is a plate and pad construction corresponding generally to plate 90 and pad 100. This construction adopts the same mounting arrangement, i.e. a pair of brackets 86a and 88a being secured in place by retaining pin 92a which extends through apertures 91a in brackets 86a and 88a and through a channel 84a which passes through the entire thickness of the shaft segment 107.

In operation and function, the plate 90 and pad 100 arrangement function identically to the construction shown in FIG. 1.

Figure 5:
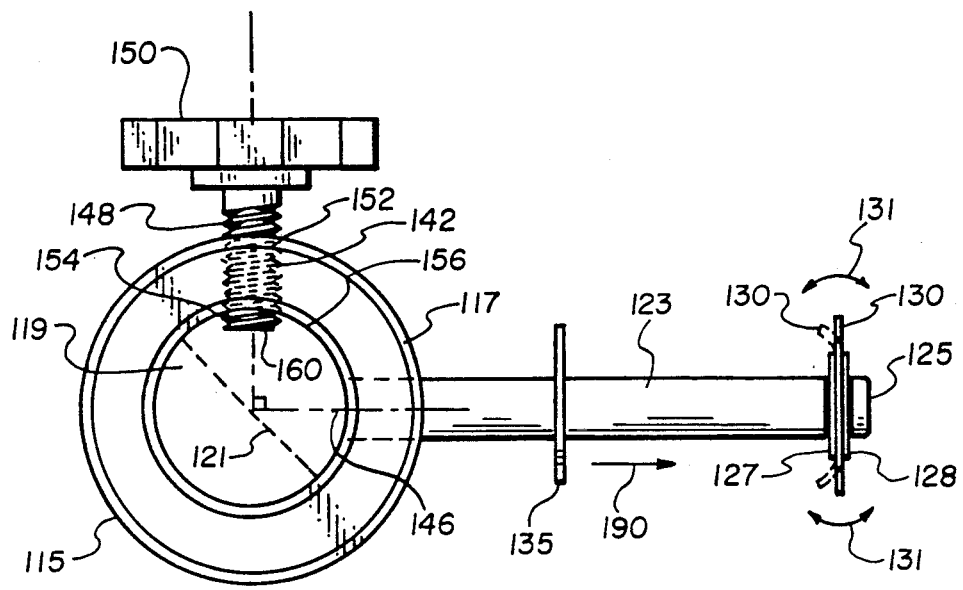
FIG. 5 is a side view of another collar construction.

Referring to FIGS. 1, 2 and 5, a collar 115 is slidably secured to the housing 10 for displacement along the length of that housing. The collar 115, as shown in detail in FIG. 5, includes an annular ring-like structure 117 which defines a generally cylindrical channel 119 which extends through the complete thickness of the ring 117. The diameter of channel 119, identified generally as 121, corresponds generally to the outer diameter of housing 10. It should be understood that the outer diameter 121 dimensionally exceeds the outer diameter FIG. 10 sufficiently that the ring 117 can be easily slid along the length of the housing 10 without obstruction. A cylindrical rod or shaft 123 is mounted in the annular ring 117 to extend generally orthogonal to the longitudinal axis of the ring 117. More exactly, the shaft 123 extends outwardly from the collar of the annular ring 117 generally radially from the center of the longitudinal axis of channel 119. Mounted on the free end 125 of shaft 123 are a pair of retaining rings 127 and 128 which are positioned spacedly apart from one another on the shaft. Sandwiched between the two retaining rings 127 and 128 is a thin, flexible, disc-shaped member 130. The disc member 130 is held in place by the retaining rings 127 and 128 and extends outwardly beyond those retaining rings to provide an extending flexible structure which is adapted to bend in the directions indicated by arrow 131 or as further shown by the dotted line segment in FIG. 5. In preferred constructions, the shaft 123 defines a pair of generally circular channels defined within the shaft 123 and adapted to receive the extending fingers of "E"-type retaining rings 127 and 128. The shaft 123 is dimensioned to be smaller in diameter than the aperture 134 in the generally "U"-shaped end or loop 135 of a measuring tape 136. The diameter of the disc member 130 is dimensioned to be larger than the width or the length of the aperture 134 defined within the "U"-shaped member 135. The disk member 130 functions to retain the loop 135 on shaft 123. As shown to advantage in FIG. 6, the user inserts the "U"-shaped loop 135 against the disc member 130 sufficiently to cause that member to bend backward as shown by the dotted line illustration sufficiently to allow the "U"-shaped loop 135 to pass over the disc member 130 and thereafter be positioned on shaft 123 such that the shaft 123 extends through the aperture 134. In this configuration, the measuring tape 136 is secured to the shaft 123 and the invention forms a secure retainer for the free end of the measuring tape 136.

The annular ring 117 of collar 115 defines a female-threaded channel 142 which is positioned generally at a 90° angle from the longitudinal axis 146 of shaft 123. As shown to advantage in FIG. 5, this female-threaded channel 142 threadedly receives a male-threaded elongate shaft 148 which has mounted on its uppermost end a hand-graspable handle 150. The channel 142 extends through the complete thickness of ring 117 and thereby provides a means whereby the threaded shaft 148 may be inserted into the channel 142 at an inlet 152 positioned on the exterior surface of ring 117 and thereafter be threadedly inserted through the entire thickness of the ring 117 and exit through an outlet 154 positioned on the interior sidewall surface 156 of ring 117. With further rotation or insertion of the shaft 148 through channel 142, the end 160 of shaft 148 may be brought into abutment against the exterior surface of housing 10. Upon the shaft 148 being abutted against the exterior surface of housing 10 with sufficient force, the shaft 148 serves to retain collar 115 in place on the surface of the housing 10. It follows that the shaft 148, by means of its handle 150 and channel 142, may function as a means of releasably retaining the collar 115 at a selected location along the length of the housing 10.

When the user desires to change the location of the collar, he simply rotates the handle 150 thereby retracting the shaft 148 through channel 142 and releasing the pressure-fit union of the shaft 148 against the exterior surface of housing 10. This in turn releases the annular ring 117 for a slidable displacement along the length of the housing 10 in the directions indicated by arrow 162 (FIG. 1). Upon the collar 115 being located in a newly-selected location, the user thereafter simply threadedly inserts the shaft 148 through the channel 142 by means of handle 150 thereby urging the free end 160 of shaft 148 into abutment against the exterior sidewall of housing 10 with sufficient force to retain the collar in place.

Figure 4:
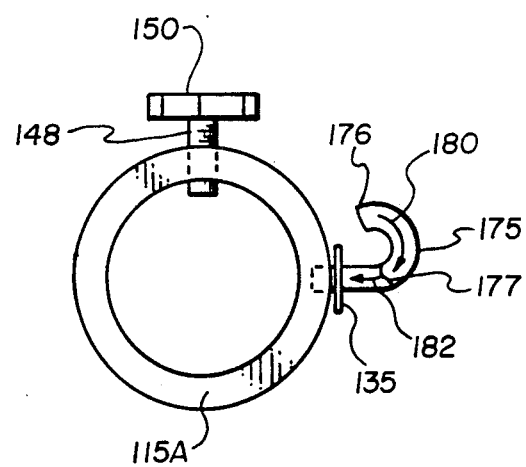
FIG. 4 is a side view of a collar construction.

FIG. 4 illustrates an alternative collar construction 115a. As shown, the shaft 148, handle 150 and channel 142 are common to both constructions. The shaft 123 and its associated retaining rings 127 and 128 and flexible disc 130 are replaced in FIG. 4 by a generally "J"-shaped member 175. The member 175 includes a generally pointed free end 176. The diameter 177 of member 175 is dimensioned to be smaller than both the length and the width of the aperture 134 of measuring tape loop 135 of measuring tape 136. It follows that the user may therefore simply hook the free end 136 over the "J"-shaped member 175 by simply inserting the point 176 of member 175 through the aperture 134 and thereafter position the end 135 on member 175. The member 136 may simply be directed along the length of the "J"-shaped member 175 in the direction indicated by the arrow 180 and 182 eventually causing the "J"-shaped member to achieve a positioning shown in FIG. 4. It follows that to retract the member 136 from "J"-shaped member 175, the user simply reverses the direction of travel of that member along "J"-shaped member 175 thereby bringing that member to the end 176 and thereafter removing the loop 135 from the "J"-shaped member 175.

Figure 6:
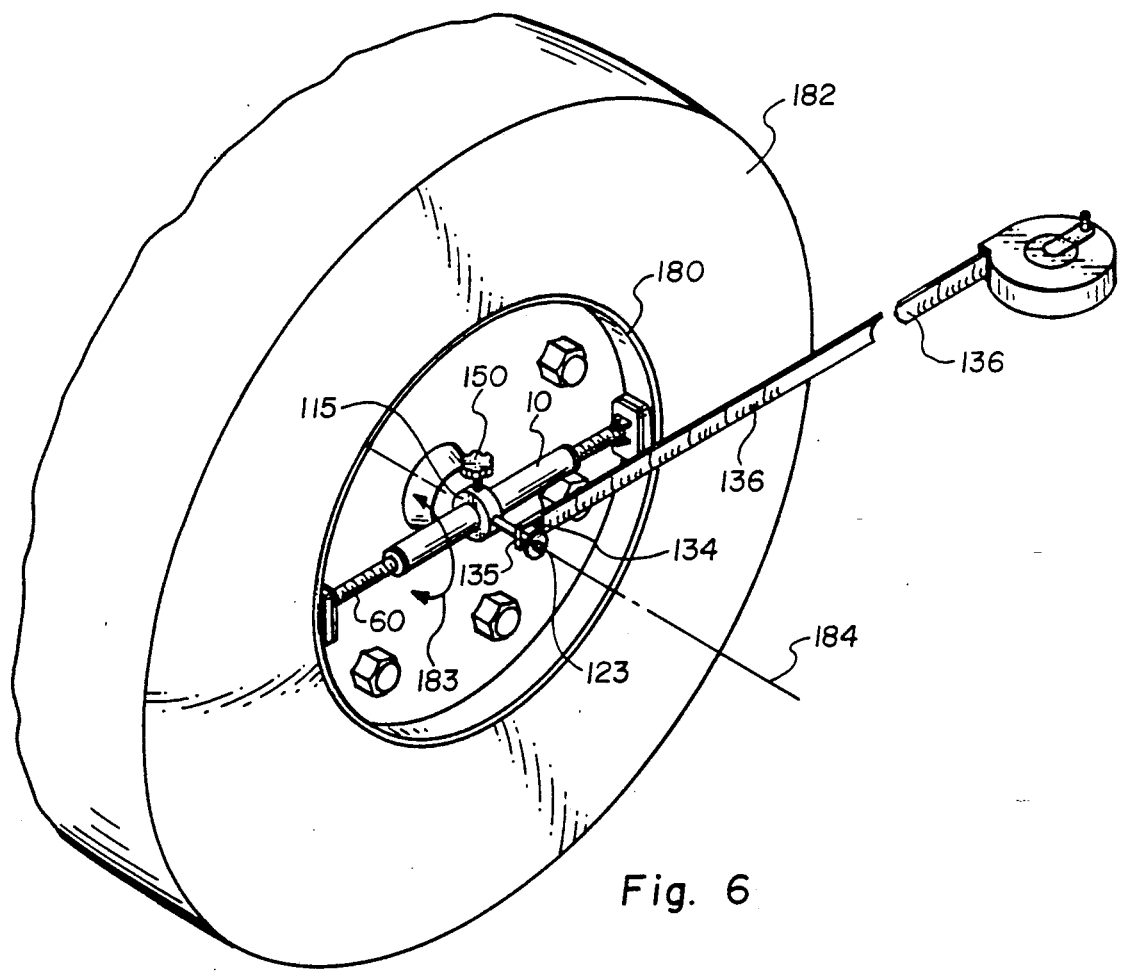
FIG. 6 is a perspective view of a vehicle wheel having the invention mounted therein and a free end of a measuring tape secured on the apparatus securement means.
Figure 7:
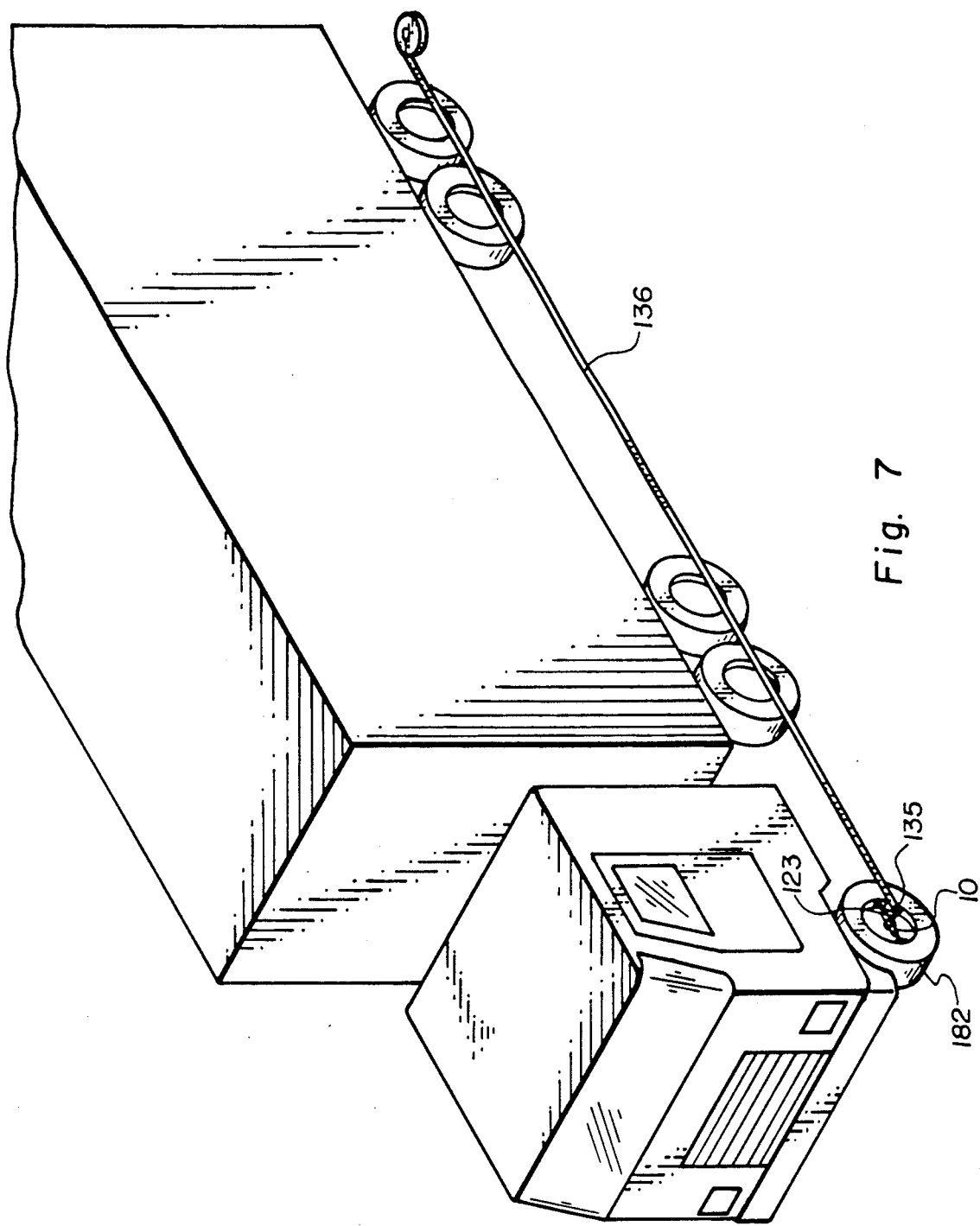
FIG. 7 is a perspective view of a semi-truck trailer having the truck span measuring apparatus of the invention mounted within the frontmost wheel of the truck. A measuring tape is secured to the invention and reeled out along the length of the truck.

In operation, the user places the housing 10 within one of the wheels of the vehicle to be measured as shown in FIG. 7. As shown more specifically in FIG. 6, subsequent to the placement of the housing 10 within the wheel well 180 of the wheel 182, the user rotates the shafts 60 and 80 by grasping either the shafts themselves or grasping the plate 71/pad 78 assembly and rotates the shaft 60 such that it is threadedly retracted from the socket 36. The user may likewise grasp either the shaft 80 or the plate 90 and pad 100 and effect a rotation which threadedly retracts the shaft 80 through socket 46. By either using either a single shaft or both of the shafts, the user is able to extend the distance between the pads 78 and 100 a sufficient distance to correspond generally to the diameter of the wheel well 183 of wheel 182 such that the pad 100 and 78 are positioned in abutment against the sidewall of the wheel well 180 in the orientation shown in FIG. 6.

In preferred constructions, once the pads 78 and 100 are abutted against the wheel well, the user may grasp a housing 10 and actually tighten the engagement of the pads against the wheel well by rotating housing 10 effecting thereby an outward displacement of both shafts 60 and 80 due to the particular orientation of the threads of the sockets and their respective threaded shafts. It follows that the user by simply rotating the housing 10 in either of the directions shown by arrow 183, may effect the abutment of the pads against the other sidewall surface of wheel well 180 with sufficient force as to retain the apparatus in place within the wheel well.

In the orientation as shown in FIG. 6, the apparatus extends generally along a diameter of the wheel well. Furthermore, a section of the housing 10 is positioned on the longitudinal axis 184 of the axle which supports the wheel 182. The truck span measurements which are to be taken use, as a bench mark, the longitudinal axis of the axle. To position the collar 115 on the longitudinal axis 184, the user rotates the handle 150 thereby retracting shaft 148 through channel 142 sufficiently to permit the annular ring 117 of collar 115 to be displaced along the length of the housing 10. The collar 114 is then displaced along the length of the housing until it is positioned such that the longitudinal axis 146 of shaft 123 is positioned collinear with the longitudinal axis 184 of the axle of wheel 182. Upon the alignment of the two longitudinal axes 146 and 184, the user rotates the handle 150 to urge shaft 148 downwardly through channel 142 until the head of the free end 160 of shaft 148 abuts against the exterior surface of housing 10 sufficiently to retain the collar 115 in place. Upon achieving the orientation of the apparatus within the wheel well 180 shown in FIG. 6, the user inserts the loop 135 of tape measure 136 over the end of shaft 123 by urging that bracket against the circular disc 130 sufficiently to cause it to bend backward permitting the loop 135 to pass thereover and be positioned on the shaft 123, i.e. shaft 123 passes through the aperture 134 thereby yielding the orientation shown in FIG. 6. Having achieved this arrangement, the user may thereafter unreel the tape 136 along the length of the vehicle as shown in FIG. 7 and measure the desired span. Having obtained the desired measurement, the user then may remove the loop 135 of the measuring tape's free end from its engagement against shaft 123 by urging the loop 135 in the direction indicated by arrow 190 until it engages against the disc member 130. Applying more force to the loop 135 in the direction indicated by 190 causes the bracket 130 to bend outwardly sufficient to permit the loop 135 to pass thereover. Loop 135 can now be disengaged from the shaft 123. By rotating the housing in the opposite direction to the direction of rotation for tightening the pads 78 and 100 against the inside of wall wheel housing 180 the user is able to cause the shafts 60 and 80 to be threadedly inserted into the housing 10 thereby disengaging the pressure-fit union of those pads against the interior sidewall of the wheel well 180 sufficiently for the apparatus to be removed from the wheel well.

Those skilled in the art will recognize that the embodiments herein discussed are illustrative of the generally principals of the invention. The embodiments herein described are not intended to limit the scope of the claims which themselves recite what applicant regards as his invention.

What is claimed:

1. A truck span measuring apparatus comprising:
   a housing having a first female-threaded socket in a first end thereof;
   a first shaft threadedly inserted into said first female-threaded socket, said first shaft extending outwardly from said housing, said first shaft having a free end;
   a second shaft mounted on said housing to extend outwardly therefrom, said second shaft having a free end;
   said first shaft and said second shaft being positionable within a truck wheel well to retain said housing in a selected position within said truck wheel well; a distance between said free ends of said first shaft and said second shaft being adjustable, permitting a user to bias said first and second shafts against said truck wheel well by adjusting said first shaft's position within said first female-threaded socket;
   a collar, slidably mounted on said housing;
   a retaining means mounted on said collar for releasably retaining said collar at a selected position on said housing; and
   a securement means mounted on said collar for releasably securing an end of a measuring tape to said collar;
   wherein said collar is releasably positionable on a longitudinal axis of a truck axle to provide a secure mounting for said end of said measuring tape, said measuring tape being usable to measure a truck's span.

2. A truck span measuring apparatus comprising:
a housing having a first female-threaded socket in a first end thereof;
a first shaft threadedly inserted into said first female-threaded socket, said first shaft extending outwardly from said housing, said first shaft having a free end;
a second shaft mounted on said housing to extend outwardly therefrom, said second shaft having a free end;
said first shaft and said second shaft being positionable within a truck wheel well to retain said housing in a selected position within said truck wheel well; a distance between said free ends of said first shaft and said second shaft being adjustable, permitting a user to bias said first and second shafts against said truck wheel well by adjusting said first shaft's position within said first female-threaded socket;
a collar, slidably mounted on said housing;
a retaining means mounted on said collar for releasably retaining said collar at a selected position on said housing; and
a securement means mounted on said collar for releasably securing an end of a measuring tape to said collar;
wherein said housing includes a second female-threaded socket in a second end of said housing, said second shaft having a plurality of male threads thereon, and said second shaft being threaded into said second female-threaded socket.

3. A truck span measuring apparatus comprising:
a housing having a first female-threaded socket in a first end thereof;
a first shaft threadedly inserted into said first female-threaded socket, said first shaft extending outwardly from said housing, said first shaft having a free end;
a second shaft mounted on said housing to extend outwardly therefrom, said second shaft having a free end;
said first shaft and said second shaft being positionable within a truck wheel well to retain said housing in a selected position within said truck wheel well; a distance between said free ends of said first shaft and said second shaft being adjustable, permitting a user to bias said first shaft and said second shaft against said truck wheel well by adjusting said first shaft's position within said first female-threaded socket;
a collar, slidably mounted on said housing;
a retaining means mounted on said collar for releasably retaining said collar at a selected position on said housing; and
a securement means mounted on said collar for releasably securing an end of a measuring tape to said collar;
wherein said securement means comprises a flexible member mounted on a third shaft, said third shaft being mounted on said collar.

4. The truck span measuring apparatus of claim 1 wherein said retaining means comprises a male-threaded bolt, threadedly inserted through said collar to abut against said housing.

5. A truck span measuring apparatus adapted for releasable mounting within a wheel well of a truck, said truck span measuring apparatus comprising:
a cylindrical, elongate tubular member defining a hollow interior, each end of said cylindrical, elongate tubular member having a female-threaded socket mounted therein;
a pair of male-threaded first shafts, each first shaft having a first end thereof threadedly inserted into a respective said female-threaded socket, each said first shaft having a free second end, a distance between said second ends being dimensionally-adjustable by adjusting the positioning of said first shafts in their respective said female-threaded sockets;
said first shafts being adjustable to releasably abut said second ends against a sidewall of a truck wheel well to retain said cylindrical, elongate tubular member within said truck wheel well;
a circular collar mounted on said cylindrical, elongate tubular member to be slidably displaceable along a length of said cylindrical, elongate tubular member;
a retaining means mounted on said circular collar for releasably retaining said circular collar at a selected position along a length of said cylindrical, elongate tubular member; and
securement means mounted on said circular collar for retaining an end of a measuring tape;
wherein said securement means comprises a flexible disc mounted on a third shaft mounted to said circular collar.

6. The truck span measuring apparatus of claim 5 wherein said flexible disc is mounted substantially perpendicular to a longitudinal axis of said third shaft.

7. A truck span measuring apparatus adapted for releasable mounting within a wheel well of a truck, said truck span measuring apparatus comprising:
a cylindrical, elongate tubular member defining a hollow interior, each end of said cylindrical, elongate tubular member having a female-threaded socket mounted therein;
a pair of male-threaded first shafts, each first shaft having a first end thereof threadedly inserted into a respective said female-threaded socket, each said first shaft having a free second end, a distance between said second ends being dimensionally adjustable by adjusting the positioning of said first shafts in their respective female-threaded sockets;
said first shafts being adjustable to releasably abut said second ends against a sidewall of a truck wheel well to retain said cylindrical, elongate tubular member within said truck wheel well;
a circular collar mounted on said cylindrical, elongate tubular member to be slidably displaceable along a length of said tubular member;
a retaining means mounted on said circular collar for releasably retaining said circular collar at a selected position along a length of said cylindrical, elongate tubular member; and
securement means mounted on said circular collar for retaining an end of a measuring tape;
wherein said retaining means comprises a male-threaded bolt which is threadedly received in a female-threaded recess well defined in said circular collar, said female-threaded recess well communicating with said cylindrical, elongate tubular member, wherein said male-threaded bolt may abut against said cylindrical, elongate tubular member to apply a force thereagainst.

8. A truck span measuring apparatus adapted for releasable mounting within a wheel well of a truck, said truck span measuring apparatus comprising;

a cylindrical, elongate tubular member defining a hollow interior, each end of said cylindrical, elongate tubular member having a female-threaded socket mounted therein;

a pair of male-threaded first shafts, each first shaft having a first end thereof threadedly inserted into a respective said female-threaded socket, each said first shaft having a free second end, a distance between said second ends being dimensionally adjustable by adjusting the positioning of said first shafts in their respective female-threaded sockets;

said first shafts being adjustable to releasably abut said second ends against a sidewall of a truck wheel well to retain said cylindrical, elongate tubular member within said truck wheel well;

a circular collar mounted on said cylindrical, elongate tubular member to be slidably displaceable along a length of said cylindrical, elongate tubular member;

a retaining means mounted on said circular collar for releasably retaining said circular collar at a selected position along a length of said cylindrical, elongate tubular member; and securement means mounted on said circular collar for retaining an end of a measuring tape;

wherein said securement means is a "J"-shaped member.

9. The truck span measuring apparatus of claim 5 wherein each said shaft second end is fitted with a rubber pad.

* * * * *